May 10, 1966  F. H. COLLINS  3,250,834
METHOD FOR MAKING FOAMABLE POLYSTYRENE PELLETS
Filed July 19, 1962

INVENTOR
FREDERICK H. COLLINS

BY Fisher, Christen, Sabol & Caldwell
ATTORNEYS

United States Patent Office 3,250,834
Patented May 10, 1966

3,250,834
METHOD FOR MAKING FOAMABLE
POLYSTYRENE PELLETS
Frederick H. Collins, Ellenville, N.Y., assignor to Sun
Chemical Corporation, New York, N.Y., a corporation
of Delaware
Filed July 19, 1962, Ser. No. 210,910
1 Claim. (Cl. 264—53)

This invention relates to a novel process for producing foamable thermoplastic material in strand, pellet, or granular form and, more particularly, relates to processes for making granular foamable thermoplastic material of high quality, eminently suitable for extrusion to form foamed articles.

Methods for making foamable thermoplastic particles have heretofore been known. However, such methods produced a foamable thermoplastic material which was unsuitable for extrusion into foamed articles without first conditioning said particles in one way or another to make them suitable for use in extrusion apparatus. For example, one prior method for making foamable particles required the use of a liquid coolant in contact with the hot foamable particles to cool them below the foaming or expanding temperature. The use of liquid coolants invariably brought about certain physical and/or chemical modifications to the particles, thus requiring additional treatments to make them suitable for use in the subsequent extrusion of foamed articles.

A principal object of this invention is to provide a process for producing foamable thermoplastic pellets or particles which are eminently suited for use in subsequent extrusion procedures to form foamed articles.

Another object is the provision of a process for producing foamable thermoplastic pellets or particles which can be subsequently extruded to form foamed articles without the necessity of special intermediate treatments.

A further object is the provision of a process for producing foamable thermoplastic particles or pellets which process and apparatus are characterized by simplicity, efficiency, and high rates of production.

Another object is the provision of a process for forming foamable thermoplastic pellets or particles which have not been adversely chemically or physically modified by the use of liquid coolants and which can be directly extruded to form foamed articles without any special prior treatment.

Further objects and advantages of this invention are apparent from the following description taken in conjunction with the appended drawings, in which.

Figure 1:
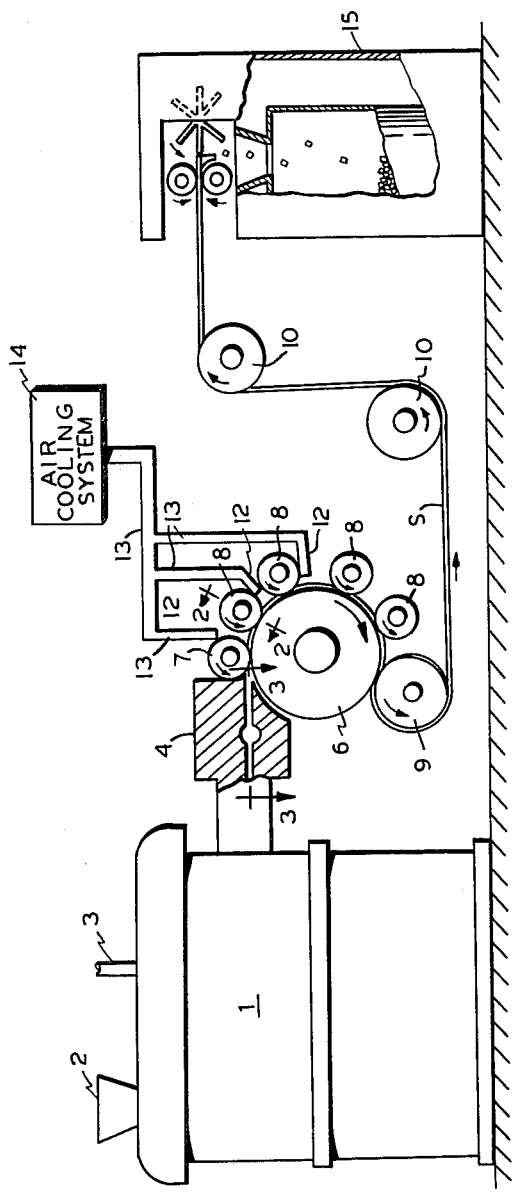
FIG. 1 is a diagrammatic side elevation of an embodiment of this invention.
Figure 4:
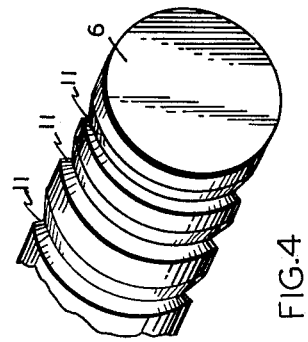
FIG. 4 is a perspective view of a chilled roll which is partially cut away.
Figure 3:
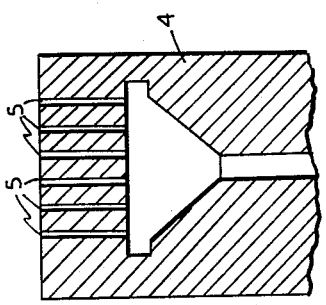
FIG. 3 is a section taken on line 3—3 of FIG. 1.

Referring now to the figures, there is shown in FIG. 1 an extruder 1 having a hopper 2, an injection tube 3, and an extrusion die 4. The extruder can be of the conventional type and the extrusion die, as best shown in FIG. 3, is of the type employed for extruding strands. The extrusion die 4, as shown in the embodiment of the figures, comprises a plurality of orifices 5 and is tapered in the direction of extrusion such that the smallest cross-sectional area of said die is at the orifices 5 and the cross-section of said die progressively increases towards the extruder 1 with the distance from said orifices.

Figure 2:
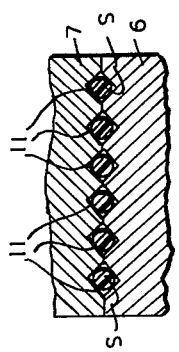
FIG. 2 is a section taken on line 2—2 of FIG. 1.

A main chilled roll 6 is provided adjacent and slightly below the extrusion die 4 such that the strands, as extruded from the orifices 5, are substantially tangential to said roll. A smaller chilled roll 7 is positioned above in substantial tangential contact with the main chilled roll 6 such that strands being extruded from the orifices 5 are directed into the nip formed by the rolls 6 and 7. Secondary chilled rolls 8 are positioned in substantial contact with the main chilled roll along a substantial portion of the periphery thereof. Guide roll 9, which may or may not be chilled, is positioned in substantial contact with the main chilled roll 6 at a point after the points of contact of secondary chilled rolls 8 with said main chilled roll. All of the chilled rolls 6, 7 and 8 are provided with means for circulating a coolant therethrough. The coolant may be of any suitable type, chilled water probably being the most expedient coolant. It is to be noted that the tapered forward end of the extrusion die 4 extends into the nip formed by the rolls 6 and 7 preferably without contacting either of said rolls. The distance the strands S must travel after leaving the orifices 5 and before contacting the roll 6 or 7 should be short, e.g., two inches, or less. Additional guide rolls 10 are provided to suitably guide the strands S as they come off of guide roll 9. All of the rolls 6, 7, and 8 are provided with aligned endless grooves 11 in the peripheral surfaces thereof, as best shown in FIG. 2 with relation to rolls 6 and 7. The cross-sectional shape of the grooves 11 is not narrowly critical and, instead of being triangular as shown in FIG. 2, the cross-section can be semi-circular or of any other suitable shape. The size of the grooves 11 is somewhat more critical than the shape and should be large enough to accommodate the strands S without unduly deforming said strands but should be small enough to provide an adequate cooling contact surface to said strands. It has been found that the triangular cross-section of the grooves 11 provides an excellent cooling contact surface for the strands S without unduly deforming said strands. Suitable driving means of any conventional type is employed to drive the rolls 6, 7, 8, 9, and 10 in the respective directions required to move the strand S from the extrusion die past the last guide roll 10. The directions of rotation of each of said rolls are shown in FIG. 1.

As an auxiliary cooling system, nozzles 12 are disposed between the rolls 7 and 8 and adjacent rolls 8. The nozzles 12 are directed towards the strands S disposed in the grooves 11 on main chilled roll 6. The nozzles 12 are connected through conduits 13 to a supply of cool air 14. The supply 14, in its most simple form, is a suction fan pulling cool air in and forcing it through conduits 13. It is not critically necessary to specially cool the air distributed to the nozzles 12, although such an expediency can be employed.

Adjacent the last guide roll 10 is positioned a pelletizer or cutter 15 which receives the strands S from said last guide roll and cuts said strands into granular form.

In operation, foamable thermoplastic strands S are extruded from the orifices 5 into the nip of rolls 6 and 7. The strands S are received in the grooves 11 which are aligned with the orifices 5 and travel around a major portion of the periphery of the main chilled roll 6, thereby cooling said strands below the expanding temperature of said strands at atmospheric pressure. The secondary chilled rolls 7 and 8 assist in cooling the strands as does the air ejected from the nozzles 12. The strands then are guided by guide rolls 9 and 10 into the pelletizer 15 where they are cut into granular form.

The following example is presented. All percentages are based on the weight of polystyrene.

*Example*

A heat-plasticized, homogeneous, intimately admixed mixture of polystyrene and 4 percent of pentane is supplied to the extrusion die 4 and is extruded at a temperature of about 250° F. through the orifices 5 to form strands S. The strands S are introduced into the nip of rolls 6 and 7 in such a manner that a strand is disposed in a groove 11 in the peripheral surfaces of said rolls 6 and 7. The main roll 6 is maintained at a temperature of 45° F. and the strands being extruded have an approximate diameter of 0.06 inch. The rolls 6 and 7 are driven in the respective directions shown in FIG. 1 to advance the strands S away from the extrusion die 4. The length of travel of the strands on the main roll 6 is approximately 24 inches and the production of strands is about 200 pounds per hour. After the strands have traveled in the grooves 11 of the main roll 6 for a sufficient distance (approximately 24 inches), to cool them to a temperature below the heat distortion temperature of the polystyrenepentane material composing said strands, they are passed around guide roll 9 and guided by guide rolls 10 into the pelletizer 15. Normal room temperature air (at about 75° F.) is circulated through the cooling system 14 and ejected from the nozzles 12 onto the strands as they pass over the main roll 6. The secondary rolls 7 and 8 are also cooled to a temperature of approximately 45° F.

The temperature at which the thermoplastic mixture is extruded from the orifices 5 is not narrowly critical and can range from 225° F. to 375° F. The pressure within the extrusion die 4, when extruding at 225° F., should be approximately 500 p.s.i. and can run as high as 4,000 p.s.i. when extruding at high temperatures. The temperature of the rolls 6, 7 and 8 also is not narrowly critical and can range from 0° F. to 100° F. The primary function of the secondary rolls 7 and 8 is to maintain the strands in close contact with the main roll 6 and, additionally, when said secondary rolls 7 and 8 are cooled, they assist in cooling the strands. It is quite important that no liquid coolant be brought into contact with the hot strands.

The main roll 6 can be any endless, rigid, arcuate to flat surface. For example, instead of being in the form of a roll, a cooled conveyor belt having endless grooves therein can be passed in front of the orifices 5 to receive and cool the strands being extruded therefrom. Similarly, the secondary rolls 7 and 8 can be employed with the conveyor belt or can be in the form of conveyor belts themselves. The surfaces of each of the rolls or conveyor belts 6, 7 and 8 which contact the strands are made of heat-conductive material so as to remove heat from said strands and transfer it to a cooling medium.

In forming the heat-plasticized mixture in the extruder 1, polystyrene in pellet or granular form is added into hopper 2. The polystyrene is then heat-plasticized at a suitable temperature, e.g., 350° F. to 450° F., and is somewhat decompressed as it approaches the injection tube 3. The pentane is introduced into the polystyrene through injection tube 3 and the resulting mixture enters a mixing and cooling zone at a suitable temperature of about 200° F. to 300° F. Thereafter, the resulting mixture is extruded at a suitable temperature, preferably below 325° F.

The foamable thermoplastic resin compositions which can be extruded by the method and apparatus of this invention consists of a thermoplastic resin and a suitable foaming or pore-forming agent. Examples of thermoplastic resins that may be employed include cellulose ethers and esters, e.g., ethyl cellulose, cellulose acetate; homopolymers and interpolymers of monomeric compounds containing the $CH_2=C<$ grouping such as olefins, e.g., ethylene, isobutylene; vinyl halides, e.g., vinyl chloride; vinylidene chloride; vinyl esters of carboxylic acids, e.g., vinyl acetate, vinyl butyrate, vinyl stearate, vinyl benzoate; vinyl ethers, e.g., vinyl methyl ether, vinyl ethyl ether, vinyl isobutyl ether; unsaturated carboxylic acids and derivatives thereof, e.g., acrylic acid, methacrylic acid, methyl acrylate, ethyl acrylate, methyl methacrylate, acrylamide, acrylonitrile, methacrylonitrile, and interpolymers of the above mentioned vinylidene monomers with unsaturated alpha,beta-unsaturated polycarboxylic acids and derivatives thereof, e.g., maleic anhydride, diethyl maleate, dibutyl fumarate, diallyl maleate, dipropyl maleate, etc. In general, optimum results are obtained with rigid, relatively non-elastic thermoplastic resins such as homopolymers and interpolymers of vinyl chloride, homopolymers of vinylidene aromatic hydrocarbon compounds and ring halogenated derivatives thereof, e.g., styrene, o-chlorostyrene, p-chlorostyrene, 2,5-dichlorostyrene, 2,4-dichlorostyrene, p-methylstyrene, p-ethylstyrene, vinyl naphthalene, alpha-methylstyrene, and interpolymers of such vinylidene aromatic hydrocarbon compounds with other vinylidene monomers in which the interpolymer contains at least 70% of the vinylidene aromatic hydrocarbon compounds. It is feasible and sometimes desirable to employ a blend of two or more thermoplastic resins such as a blend of styrene and a rubbery polymer, e.g., natural rubber, butadiene-acrylonitrile rubbers and the like. High impact polystyrene prepared by polymerizing monomeric styrene in the presence of a rubbery diene polymer also may be employed advantageously.

Suitable foaming agents for the thermoplastic resins are well known and the selection of the particular foaming agents to be employed will be dictated largely by the particular thermoplastic resin in which it is to be incorporated. It is preferred to employ as foaming agents non-reactive organic liquids which have not more than a slight solvent action on the thermoplastic resin and which volatilize below the softening point of the thermoplastic resin. Such agents include these boiling between 80° F. to 200° F. Examples of suitable foaming agents that may be employed include pentane, hexane, heptane, petroleum ether, cyclopentane, cyclopentadiene, acetone, methanol, methyl acetate, ethyl acetate, methyl formate, ethyl formate, dichloroethylene, isopropyl chloride, propionaldehyde, and diisopropyl ether. Usually the foaming agent will be employed in the amount of about 2½–10 and preferably 5–8 weight percent of the thermoplastic resin.

Important advantages in cooling and prevention of expansion are obtainble by pressure contacting the strands of foamable thermoplastic material between the main roll 6 and any one or more of auxiliary rolls 7 through 9. This is accomplished by making the grooves 11 of a size smaller than the strand S as it reaches the rolls, such that the surfaces of said grooves pressure-contact the surfaces of said strands.

The above description and particularly the example are set forth by way of illustration only. It will be obvious to those skilled in the art that many variations and modification thereof can be made without departing from the spirit and scope of the invention herein described.

What is claimed is:

A process for making a foamable polystyrene composition which contains pentane in addition to polystyrene uniformly dispersed throughout without contacting said foamable composition with a liquid coolant such as water, said process comprising the steps of, supplying a uniform, heat-plasticized mass comprised of said polystyrene and pentane to a plurality of extrusion orifices arranged side by side at a temperature of about 225° F. to 375° F. and at a pressure to prevent expansion, extruding said mass through said orifices in the form of a plurality of strands into a zone of substantially atmospheric pressure, and substantially immediately, and prior to appreciable expansion of the extruded material disposing each of said strands in a groove formed in the peripheral surface of a large rotating roll and at about the same time in a groove formed in the peripheral surface of a first small rotating roll mating with said large rotating roll to enclose said strands between said large roll and small roll, thereafter retaining each of said strands in said groove of said large roll while successively disposing each of said strands in grooves formed in the peripheral surfaces of successive small rolls mating with said large roll around the peripheral surface thereof, all of said rolls being maintained at a temperature below the expanding temperature of said extruded material at atmospheric pressure to cool said extruded material to a temperature below the expanding temperature thereof at atmospheric pressure, directing cooling air on said strands immediately as they exit from said orifices, and thereafter removing said strands from said grooves and cutting said strands into pellets.

References Cited by the Examiner

UNITED STATES PATENTS

| | | |
|---|---|---|
| 345,539 | 7/1886 | Pfanukuchi. |
| 2,289,774 | 7/1942 | Graves. |
| 2,294,630 | 9/1942 | Reichel et al. |
| 2,374,069 | 4/1945 | Balthis. |
| 2,401,236 | 5/1946 | Fielitz. |
| 2,582,294 | 1/1952 | Stober. |
| 2,964,799 | 12/1960 | Roggi et al. |
| 3,011,217 | 12/1961 | Carlson. |
| 3,026,272 | 3/1962 | Rubens et al. |
| 3,026,273 | 3/1962 | Engles. |
| 3,042,972 | 7/1962 | Lafferty. |
| 3,069,725 | 12/1962 | Root. |
| 3,076,999 | 2/1963 | Washburn. |
| 3,108,320 | 10/1963 | Daester. |

FOREIGN PATENTS

| | | |
|---|---|---|
| 740,458 | 11/1955 | Great Britain. |
| 624,083 | 7/1961 | Canada. |
| 372,727 | 7/1939 | Italy. |

ROBERT F. WHITE, *Primary Examiner.*

MORRIS LIEBMAN, *Examiner.*

P. E. ANDERSON, S. A. HELLER,
*Assistant Examiners.*